United States Patent

[11] 3,588,686

| [72] | Inventors | Orson R. Lingmann |
| --- | --- | --- |
| | | Salt Lake City; |
| | | Milton O. Gold, Sandy, Utah |
| [21] | Appl. No. | 732,204 |
| [22] | Filed | May 27, 1968 |
| [45] | Patented | June 28, 1971 |
| [73] | Assignee | Kennecott Copper Corporation |
| | | New York, N.Y. |

[54] TRAMP METAL DETECTION SYSTEM WITH BELT SPLICE AVOIDANCE FOR CONVEYORS
12 Claims, 4 Drawing Figs.

[52] U.S. Cl. .................................................. 324/41,
209/111.8, 340/259
[51] Int. Cl. .................................................. G01r 33/00
[50] Field of Search .......................................... 324/34, 37, 40, 41, 111.8, 111.5; 209/(Inquired); 340/258 (C), 259

[56] References Cited
UNITED STATES PATENTS

| 1,695,679 | 12/1928 | Berlowitz | 324/34 |
| 2,027,814 | 1/1936 | Delanty | 324/39 |
| 2,587,785 | 3/1952 | Straehl | 324/37 |
| 2,869,074 | 1/1959 | Clapp | 324/41 |
| 2,958,037 | 10/1960 | Riede et al. | 324/41 |

Primary Examiner—Rudolph V. Rolinec
Assistant Examiner—R. J. Corcoran
Attorneys—John L. Sniado, Mallinckrodt and Mallinckrodt, P. H. Mallinckrodt and Philip A. Mallinckrodt

ABSTRACT: A system for detecting and warning or otherwise reacting to the presence of pieces of tramp metal in ore or other materials being carried on a conveyor belt, without false responses due to the presence of metallic components, such as splice lacings, at intervals along the length of the belt. Means are provided for clamping the tramp metal detector output portion of the system during travel of such metallic components of the belt past the tramp metal sensing portion of the system. The clamping means are triggered by a proximity detector located adjacent to the conveyor belt upstream from the tramp metal sensing portion of the system, and are reset by a second proximity detector located downstream from the tramp metal sensing portion of the system, or by time-delay means. The latter is preferably provided in any event as a safety measure.

The metal sensing portion is preferably an electrical coil constructed to easily fit around an endless conveyor belt.

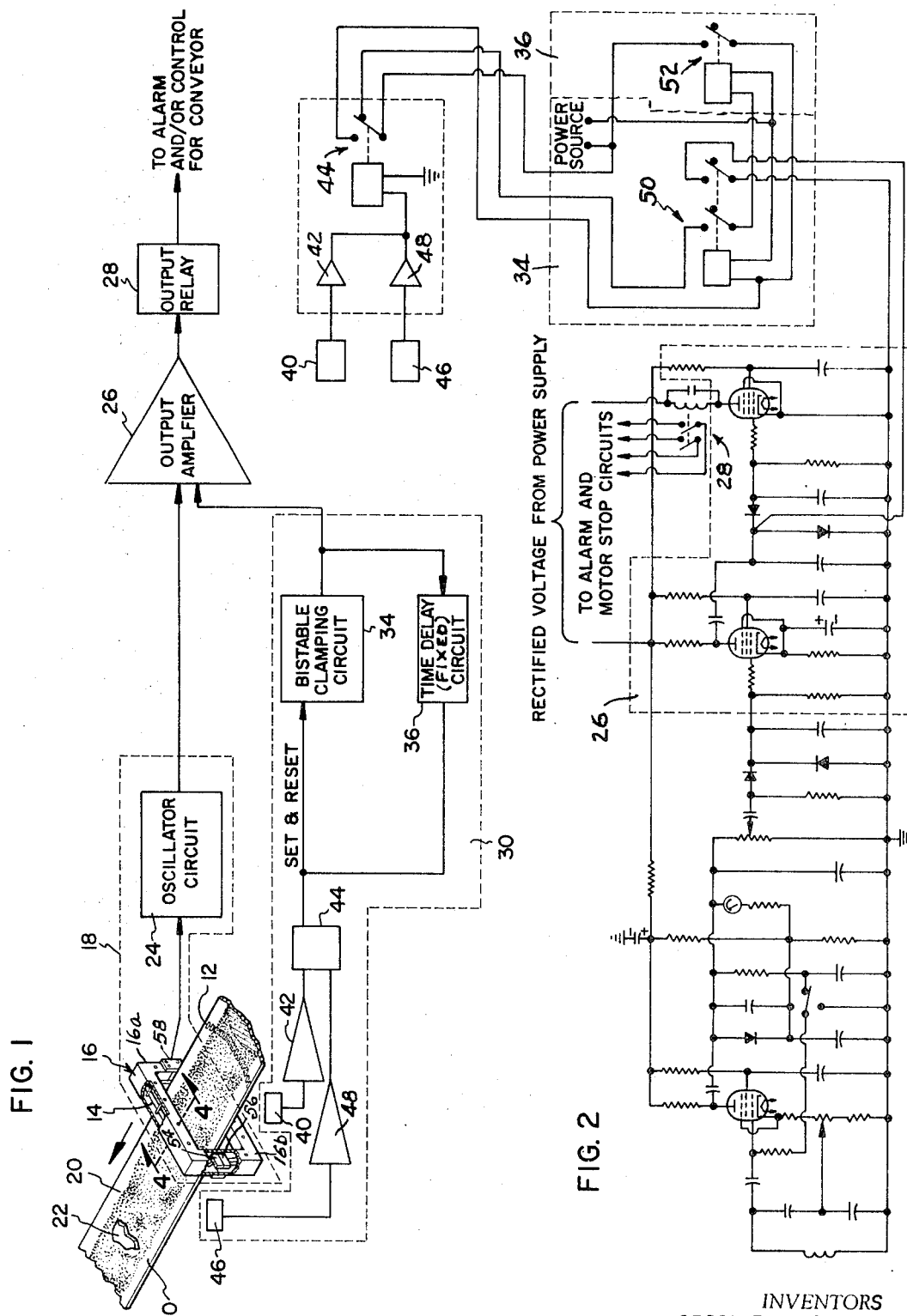

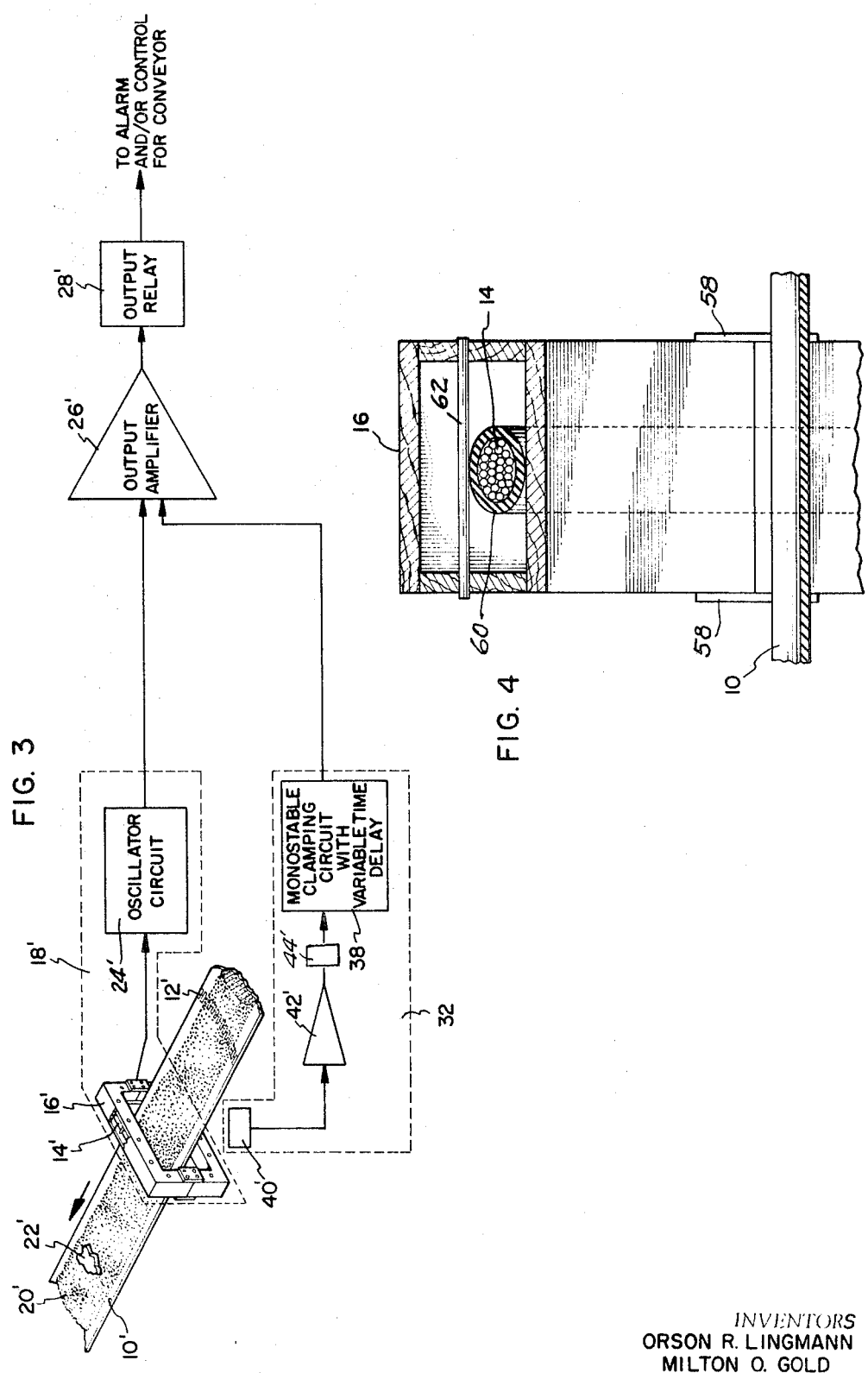

3,588,686

TRAMP METAL DETECTION SYSTEM WITH BELT SPLICE AVOIDANCE FOR CONVEYORS

BACKGROUND OF THE INVENTION

1. Field

The invention is related to electronic systems for detecting pieces of scrap or other tramp metals that are inevitably present from time to time—but don't belong—in ores or other industrial material being conveyed as a stream from one location to another, usually by means of an endless conveyor belt.

2. State of the Art

Electronic systems of the type concerned are well known. They normally sound an alarm when a piece of tramp metal is detected, so the conveyor can be stopped and the piece of metal removed; sometimes they are constructed to automatically stop the conveyor.

Most conveyor belts are made up of lengths of rubber belting spliced together transversely across the width by metal lacings. These lacings, occurring at intervals along the length of the belt as they do, are detected by the sensing devices of tramp metal detecting systems and give false alarms that are accompanied by needless stoppages of the conveyor belts.

SUMMARY OF THE INVENTION

In accordance with the present invention, means are provided in a tramp metal detection system for deactivating such system during travel of the metal lacings past the sensing portion of the system. The deactivating means advantageously takes the form of clamping means for the detector output portion of the tramp metal detection system, which clamping means conveniently comprises a bistable circuit triggered by signals from a proximity detector located adjacent to the conveyor belt upstream of the tramp metal sensing device. The proximity detector is so placed with respect to the conveyor belt as to be unaffected by pieces of tramp metal carried by the belt but as to be actuated by the metal lacings.

The clamping can be and usually is released to reactivate the tramp metal detection system by retriggering of the bistable circuit as the conveyor belt lacing travels on beyond the tramp metal sensing device, or the bistable circuit can be returned to its original state, i.e. reactivated, by time-delay means. Even though retriggering is provided for, e.g. by the provision of a second proximity detector downstream from the tramp metal sensing device, it is prudent to also provide time-delay means as a safety measure insuring continued functioning of the system should triggering or retriggering be inadvertently carried out, e.g. by a workman bringing a metal tool into proximity with one of the proximity detectors.

As is customary in tramp metal detection systems, the sensing device is preferably an electrical coil mounted in a noninductive frame, the conveyor belt being threaded through the coil. A feature of the invention is the construction of the coil and frame in separate halves for installation above and below the conveyor belt, the separate half portions of the coil being joined by male and female electrical connectors of standard type and the so-formed coil being securely anchored in a receiving trough of the frame by a series of retaining pins or the like extending transversely of the trough through receiving openings provided in the frame at the proper level.

THE DRAWINGS

Specific embodiments representing what are presently contemplated as the best modes of carrying out the invention are illustrated in the accompanying drawings in which:

FIG. 1 is a block diagram showing the general layout of a preferred form of tramp metal detection and belt splice avoidance system of the invention applied to an endless belt conveyor, which conveyor is shown fragmentarily;

FIG. 2 is a detailed wiring diagram showing specific circuitry for the system as represented by FIG. 1;

FIG. 3 is a block diagram similar to FIG. 1 but representing a somewhat different form of the invention; and FIG. 4 is a fragmentary vertical section taken on the line 4–4 of FIGS. 1 and 3 and drawn to a considerably larger scale.

DETAILED DESCRIPTION OF ILLUSTRATED EMBODIMENTS

In FIG. 1 there is illustrated diagrammatically a particular system of the invention applied to an endless belt conveyor, which is of standard construction and includes an endless conveyor belt 10 of rubber or the like arranged to travel in the direction of the arrow. The belt is made up of one or more lengths of the usual rubber belting material having ends spliced together by metal lacings 12 in customary manner. It is threaded through an electrical coil 14, constituting the sensing device of the system, and is arranged to travel in the direction of the arrow.

The coil 14 is supported by a noninductive frame 16 and both it and the frame are preferably constructed as shown in FIGS. 1, 3, and 4 to easily receive the endless belt 10 and to permit it to be easily removed for repair or replacement, all as described hereinafter.

Such coil 14 constitutes part of tramp metal detector circuitry 18, which may be of any known type, as for example that constituting the greater part of FIG. 2 which utilizes the coil as part of a tuned capacitive-inductive network providing positive feedback for a modified Colpits oscillator, all as disclosed by a publication of Russian technology entitled "Exchange of Experience," specifically the portion designated 622.7.002.5 – 53.2 "Operation of MA – 1 Metal Detectors." By designing the coil and oscillator to operate between 5,000 and 20,000 Hz., the effect of distributed metal particles such as occur in metal ores, indicated at 20, FIG. 1, is minimized, while pieces of scrap metal and the like, see 22, have a relatively great effect.

As indicated in the block diagram of FIG. 1, whatever the particular construction of the oscillator circuit 24, the signals therefrom are usually fed into an output amplifier 26 and the amplified signals into an output relay 28 or other device for actuating an alarm and/or control for the conveyor and/or for other handling or processing equipment for the material concerned.

In accordance with the invention, a system is provided for avoiding false responses due to localized metallic components of the conveyor belt, e.g. the metal lacings 12.

This avoidance or deactivation system indicated generally 30, FIG. 1, and 32, FIG. 3, comprises means for deactivating the tramp metal detection system described above. Such means preferably take the form of an output clamping circuit for the output of the tramp metal detection system. In the system of FIG. 1 this is bistable, see 34, with or without a fixed time delay circuit 36; in the system of FIG. 3, where like parts are similarly designated with a prime added, it is monostable, with variable time delay, see 38.

The avoidance or deactivation system also comprises metal detecting means adapted to be located upstream of the conveyor belt from the sensing coil 14 and sensitive to the belt splice lacing 12 but relatively insensitive to pieces of tramp metal carried by the belt. Such metal detecting means preferably comprises a proximity detector 40 of standard type, such as a Honeywell No. 16 FS1 manufactured by Minneapolis-Honeywell, Inc. located below but close (approx. one-fourth inch) to the conveyor belt 10, for sensing the belt splice lacing 12 as it passes by in the direction of the arrow, i.e. toward the coil 14.

The signal from this proximity detector 40 is passed through an amplifier 42 and fed through a relay 44 to the output clamping circuit 34, or 38 in the instance of the embodiment of FIG. 3, which places a clamping signal on the output amplifier 26 to render it ineffective.

In the embodiment shown in FIG. 1 the bistable clamping circuit 34 provides a steady clamping signal output in one of its stable conditions, and, in its other stable condition, provides no clamping signal output. Its output not only produces a clamping signal for amplifier 26, but is fed back through the fixed time delay circuit 36 and provides an additional signal to the input of such circuit 34 in order to reset the bistable component thereof into the no-signal condition after a predetermined time delay.

In this FIG. 1 embodiment of the invention the time delay circuit 36 is provided as a safety factor in the event of malfunction or inadvertent operation of the deactivation system. For normal operation, a second proximity detector 46 is provided downstream of the conveyor from the tramp metal sensing coil 14 and is connected to feed its signal through an amplifier 48, through relay 44, and thence to clamping circuit 34. This resets such clamping circuit and, in effect, reactivates the tramp metal detection system as soon as the metal splice lacings 12 pass through coil 14. The time delay circuit is also rendered ineffective, for the signal activating it is terminated.

In this arrangement, the amplifiers 42 and 48 and the relay 44 are conveniently provided in commercially available packaged form, e.g. by a Honeywell No. 68 FL'1 Proximity Control Amplifier, as shown within broken lines in FIG. 2.

As further shown in FIG. 2, the bistable clamping circuit 34 preferably comprises a stepping relay 50, connected in circuit with the relay 44 and with a preset time delay relay 52, constituting the fixed time delay circuit 36. Connection with the output amplifier of the tramp metal detection system is as illustrated. Instead of the stepping relay 50, other relays, flip-flop circuits, etc. could be employed as bistable means.

The system of FIG. 3, employing a monostable clamping circuit with variable time delay is a variant of to the embodiment of FIG. 1, the second proximity detector 46 being omitted and a variable time-delay network being provided as part of the clamping circuit. It is primarily useful in connection with a constant speed conveyor, whereas the system of FIG. 1, with its fixed time delay is primarily useful with a variable speed conveyor.

As previously indicated, a feature of the invention is the construction of the sensing coil 14 and its supporting frame 16. The coil is cut transversely at one side thereof, so it can be easily slipped onto the conveyor belt, and is provided with male and female, multiple point, electrical connectors, see 54 and 56, respectively, FIG. 1, at the confronting cut ends. Such connectors may be standard "Amp" type as manufactured by American Pamcor, Inc. The noninductive supporting frame 16, shown as of tubular, wood construction, is made in separate upper and lower sections 16a and 16b. These are placed together end to end at opposite sides of the conveyor belt and are joined, as, for example, by splicing with wood pieces 58 screwed to the frame.

The coil 14 is advantageously covered by an exterior protective and stabilizing sheath of rubber or similar noninductive material, which is conveniently a length of hose 60, FIG. 4.

Coil 14, as thus constituted, is positioned and held in place in frame 16, as thus constituted, by means of pins 62 (which may be ordinary wooden dowels) passed through receiving holes appropriately located in the side walls of frame 16, all as is clearly shown in FIG. 4.

Whereas this invention is here illustrated and described in detail from the standpoint of presently preferred specific embodiments thereof, representing what are presently regarded as the best mode of carrying out the invention, it is to be realized that various changes may be made within the generic purview of the disclosure without departing from the claimed subject matter.

We claim:

1. In a tramp metal detection system for belt conveyors and the like, which system comprises tramp metal sensing means for detecting pieces of metal in material carried by the belt, and means for producing an output signal when a piece of metal is detected, a system for avoiding false responses due to localized metallic components of the conveyor belt, comprising:

means for deactivating said tramp metal detection system;

metal detecting means adapted to be located upstream of the conveyor belt from said tramp metal sensing means and sensitive to said localized metallic components of said belt but relatively insensitive to pieces of tramp metal carried thereby, for triggering said deactivating means when a localized metallic component of the conveyor belt approaches said tramp metal sensing means; and means for reactivating said tramp metal detection system when said localized metallic component has travelled past said tramp metal sensing means.

2. The combination defined by claim 1, wherein the means for reactivating the tramp metal detection system comprises a second metal detecting means adapted to be located downstream of the conveyor belt from the tramp metal sensing means.

3. The combination defined by claim 2, wherein there are additionally provided time delay means arranged to trigger the means for deactivating the tramp metal detection system after a predetermined period of time has passed following travel of a localized metallic component of the conveyor belt past the second metal detecting means.

4. The combination defined by claim 3, wherein the time delay means is of fixed type.

5. The combination defined by claim 4, wherein both metal detecting means are proximity detectors; the tramp metal detection system includes an output amplifier for electrical signals generated by said proximity detectors; and the means for deactivating the tramp metal detection system includes a bistable clamping circuit for clamping the output of said amplifier.

6. The combination defined by claim 1, wherein there are additionally provided time delay means arranged to trigger the means for deactivating the tramp metal detection system after a predetermined period of time has passed following travel of a localized metallic component of the conveyor belt past the tramp metal sensing means.

7. The combination defined by claim 6, wherein the time delay means is of variable type.

8. The combination defined by claim 6, wherein the metal detecting means is a proximity detector; the tramp metal detection system includes an output amplifier for electrical signals generated by said proximity detector; the means for deactivating the tramp metal detection system includes a monostable clamping circuit for clamping the output of said amplifier; and the means for reactivating the tramp metal detection system includes a variable time delay.

9. The combination defined by claim 1, wherein the tramp metal sensing means comprises an electrical coil for encircling the belt of the conveyor, said coil being cut transversely at one side thereof with the confronting cut ends adapted to be joined following placement of the coil around said belt; mating electrical connectors secured to the respective cut ends of said coil; and means for supporting said coil in place around said belt of the conveyor.

10. The combination defined by claim 9, wherein the coil supporting means is a noninductive tube of configuration corresponding in general with that of the coil and made up of separate upper and lower tubular sections adapted to be joined end to end; means for joining together the ends of the said tubular sections; and means for securing the coil in position within said supporting means.

11. The combination defined by claim 10, wherein the coil securing means comprise noninductive pins passing transversely through the tube walls and across the interior of tube at intervals along the length of the tube.

12. The combination defined by claim 11; wherein the coil is additionally encased in a length of noninductive tubing.